United States Patent [19]

Masse

[11] Patent Number: 4,494,444
[45] Date of Patent: Jan. 22, 1985

[54] APPARATUS FOR CUTTING GLASS

[76] Inventor: Joseph H. Masse, 151 Coggeshall St., New Bedford, Mass. 02746

[21] Appl. No.: 487,612

[22] Filed: Apr. 22, 1983

[51] Int. Cl.³ .............................................. C03B 33/02
[52] U.S. Cl. ...................................... 83/886; 83/563; 83/648; 83/881
[58] Field of Search ................. 83/886, 881, 563, 648, 83/879, 880; 33/32 E

[56] References Cited

U.S. PATENT DOCUMENTS

| 3,945,278 | 3/1976 | Strauss et al. | 83/886 |
| 4,120,220 | 10/1978 | Mullen | 83/886 |
| 4,222,300 | 9/1980 | El-Habr | 83/886 |
| 4,385,540 | 5/1983 | Dieter | 83/886 |
| 4,437,376 | 3/1984 | Flint | 83/886 |

*Primary Examiner*—Donald R. Schran
*Attorney, Agent, or Firm*—Robert J. Doherty

[57] ABSTRACT

An apparatus for cutting glass wherein a scoring element is pivotally connected to the upper arm of a substantially U-shaped member. The lower arm of such member is clamped to a housing and may be rotated with respect thereto such that the upper arm and thus the scoring element may be moved to various positions overlying the top surface of the supporting table for the sheet of glass or other material. A roller or wheel that projects slightly above the supporting surface and which may be motor driven is used to frictionally guide the sheet beneath the scoring element. In order to apply the necessary pressure between the scoring element and the sheet, a force or jacking mechanism is supported between the upper and lower arm so as to force the arms apart to a spread position. Thereafter the scoring element is positioned against the glass surface and the jacking element released such that the arms move together by inherent spring tension so as to apply the desired predetermined force upon the glass sheet. The primary use of the apparatus is to facilitate arts and crafts projects involving the use of intricately cut glass shapes but more broadly includes the cutting and scoring of other sheet material such as wall and floor tile and the like.

11 Claims, 6 Drawing Figures

4,494,444

APPARATUS FOR CUTTING GLASS

BACKGROUND AND OBJECTS OF THE INVENTION

This invention is directed to an apparatus or device which has primary use in the field of glass cutting. Inasmuch as many people involved in cutting glass and particularly for arts and crafts projects have little or no experience with the use of glass cutters, a device of this type in which the sheet is moved passed a mechanically held and spring biased scoring element facilitates such procedures.

One such device which operates in the overall aforementioned manner is shown in U.S. Pat. No. 4,120,220 issued Oct. 17, 1978. The present invention comprises an improvement over such device in its ease of operation, its flexibility of purpose, and its constructional simplicity. These and other objects of the present invention are provided by an apparatus for cutting glass or other sheet material comprising a housing including a table having an upper substantially planar supporting surface for supporting and moving said sheet with respect thereto, a substantially U-shaped member having an upper arm and a lower arm, said lower arm fixedly connected to said housing for supporting said upper arm in a position overlying said table, a scoring element positioned on said upper arm for spring biased pressure contact with sheet disposed on said table, and means for temporarily forcing said upper arm upwardly with respect to said table so as to adjust said pressure contact between said scoring element and said sheet and for thereafter releasing said force.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
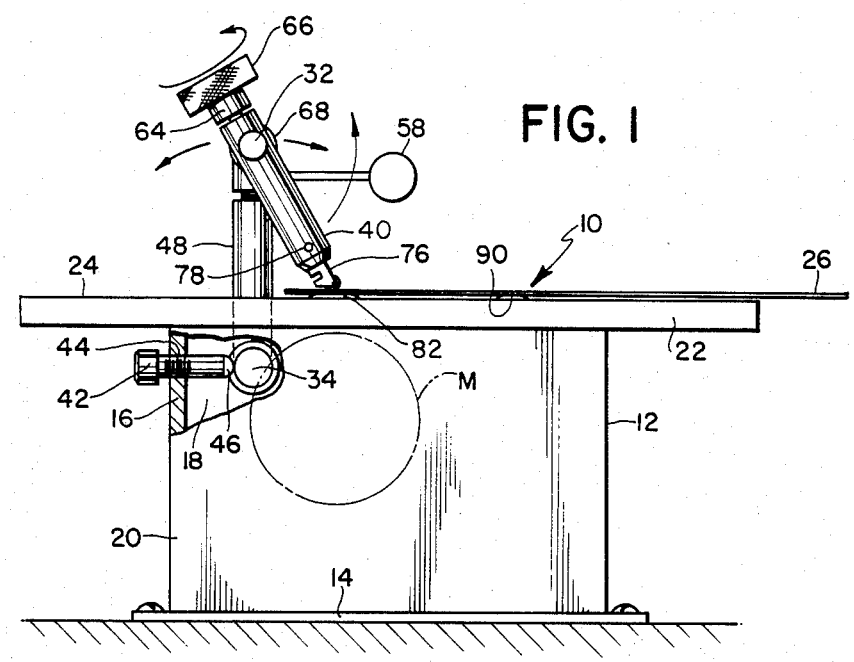
FIG. 1 is a side elevational view showing the device of the present invention.

Turning now to the drawings, it may be seen that the glass cutting apparatus 10 of the present invention includes a housing 12 comprising a base plate 14 and upstanding side, rear, and front plates 16, 18, and 20 respectively. Such plates in turn support a platform 22 having a substantially planar upper surface 24. Such surface 24 is adapted to support a sheet, tile, or other article to be scored and/or cut in line with the overall intended use of the device 10. Such sheet or article 26 is primarily intended to be manipulated by both of the artisan's hands simultaneously so as to achieve a greater degree of convenience and control over the process especially for those with limited experience in glass cutting. The device may be fixed to a supporting surface as shown in FIG. 1 but is intended to be portable as well.

The following structural aspects of the device 10 enable such aforementioned results to be achieved in a simple, straightforward manner and to be easily constructed from readily available component parts. A generally U-shaped member 30 formed from steel bar stock or the like includes an upper arm or bar 32, a lower arm or bar 34, and a connecting arm 36. The lower arm is adapted to be received in a housing sleeve 38 so as to be rotatable with respect thereto between a variety of fixed positions. In this way, a scoring element 40 attached to the upper arm 32 may be selectively disposed in various positions overlying the supporting surface 24. A set screw 42 threadably supported in the proximal side plate 16 may be utilized to engage the lower arm 34 through an opening 46 through the sleeve 38 so as to fix the position of the lower arm 34 and, accordingly, of the entire member 30 vis-a-vis the housing 12.

By nature of the member 30, it should be apparent that the upper and lower arms 32 and 34 respectively may be forced apart and when such force is removed spring back to their original position. Force means 48 in the form of a jack is utilized to temporarily spread the arms 32, 34 apart, that is, to temporarily elevate the upper arm 32 with respect to the lower arm 34 when the member 30 is positioned by the housing 12 in the intended manner as shown in the drawings. This jacking or elevation of the upper arm 32 also elevates the scoring element or device 40. This sheet 26 is then disposed on surface 24. Thereafter after contact between the scoring element 40 and the sheet 26 is brought to bear upon the sheet 26 by the downward force upon the scoring element 40 by reason of the upper arm's downward bias towards the original unspread position. In this manner, the intended and necessary scoring pressure which is self-adjustable for various thicknesses of sheet material 26 may be brought about and the sheet 26 manipulated with both hands of the user.

Figure 2:
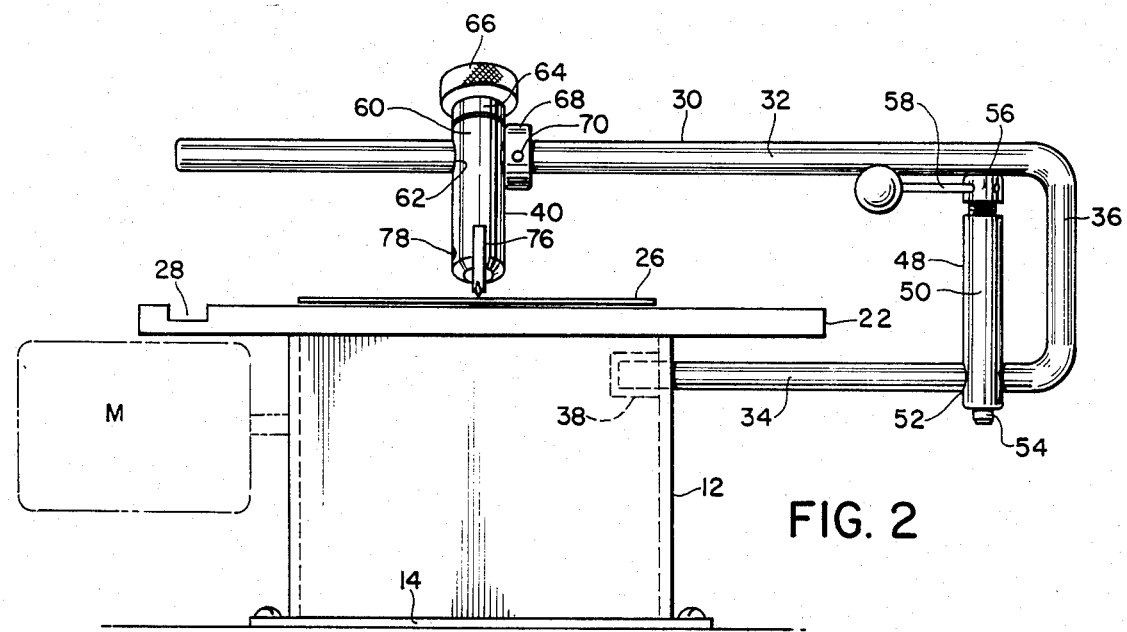
FIG. 2 is a front elevational view depicted in the ready position wherein the upper arm has been upwardly tensioned with respect to the lower arm.
Figure 3:
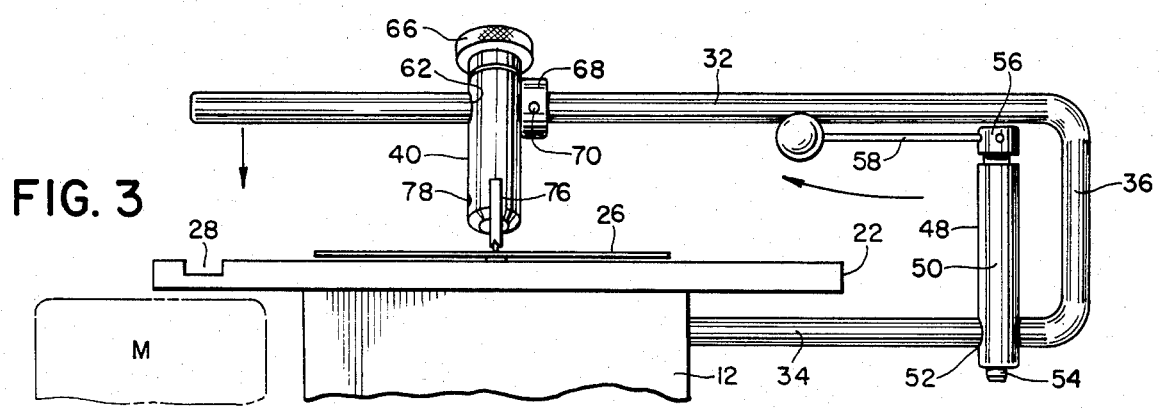
FIG. 3 is a front elevational view similar to FIG. 2 but showing the manner in which the upper arm exerts force upon the sheet to be scored when released from its upwardly tensioned position as shown in FIG. 2.

The jack 48 includes a body 50 of generally cylindrical configuration having a laterally extending opening 52 through which the lower arm 34 is adapted to extend. A set screw 54 is threadably engaged in the bottom of the body 50 and adapted to move upwardly so as to contact the lower arm 34 and thus secure the jack 48 in a position between the upper and lower arms 32 and 34 respectively and in the plane defined thereby. The upper end of the body 50 includes a threadably mounted head 56 such that the head moves longitudinally up and down with respect to the body 50. Thus by grasping and rotating the handle 58, the upper portion of the head 56 can be brought to bear on the under portion of the upper arm 32 so as to force such in an upward direction and place an inherent tension upon the upper arm 32 as shown in FIG. 2. When this tension is relieved by rotating the handle 58 in the opposite direction, the head 56 moves downwardly and, accordingly, enables the upper arm 32 to resume its original position, that is, if unrestrained as by the insertion of a sheet 26 between the scoring element 40 and the supporting surface 24 of the table 22 as depicted in FIG. 3 of the drawings.

Figure 4:
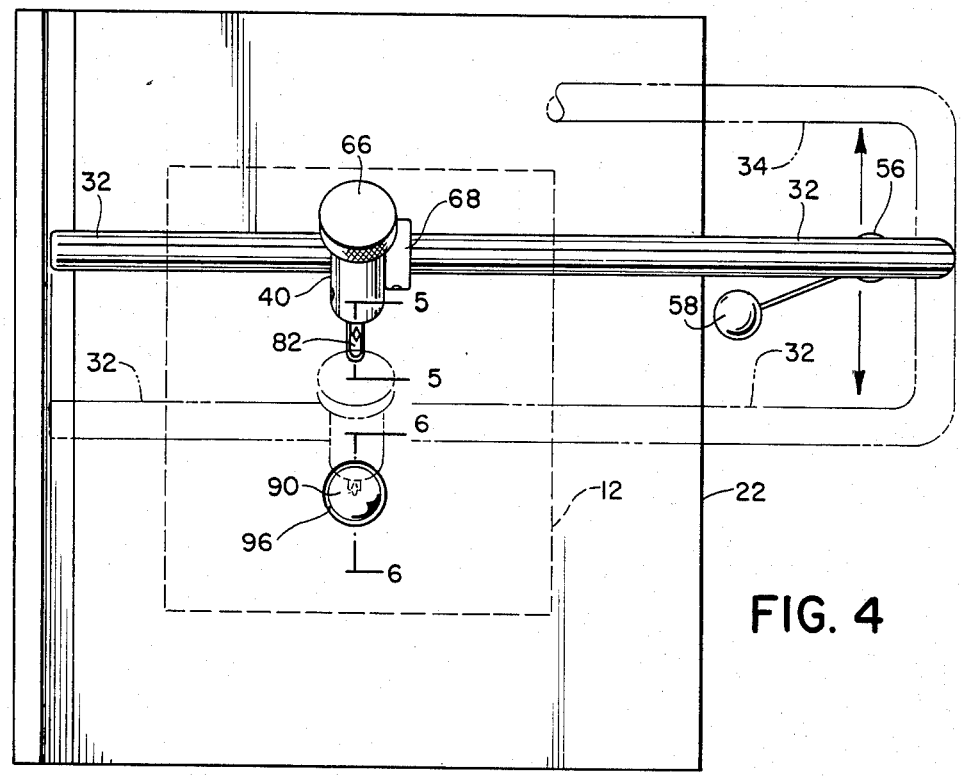
FIG. 4 is a top plan view showing the manner in which the supporting member for the scoring element may be rotated to enable it to be positioned in various overlying positions with respect to the supporting table.
Figures 5, 6:
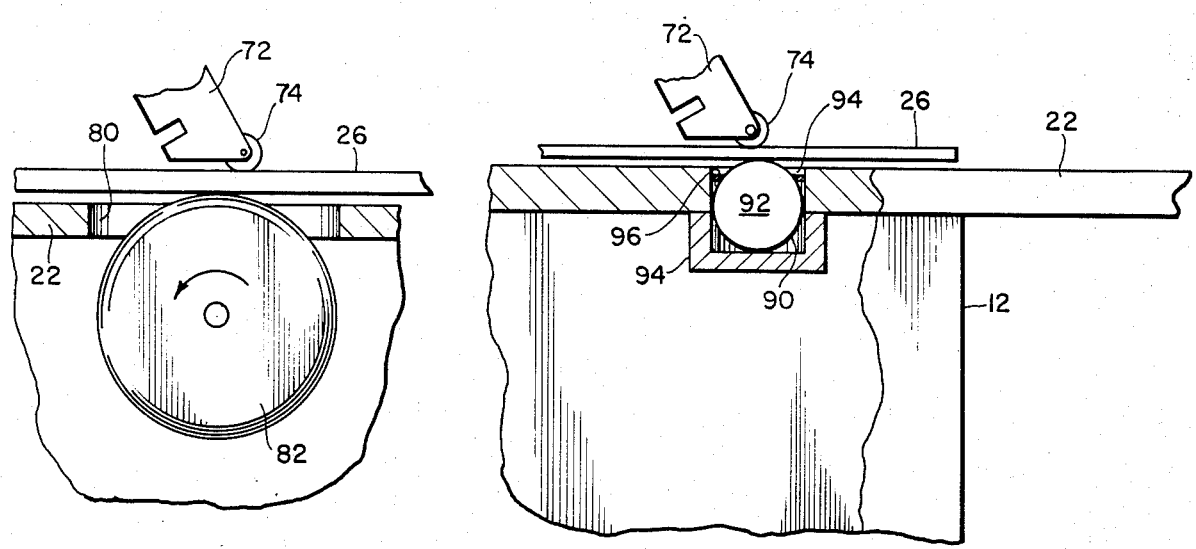
FIG. 5 is a side sectional view taken along the line 5—5 of FIG. 4.
FIG. 6 is a sectional view taken along the line 6—6 of FIG. 4.

The scoring element or device 40 includes a body 60 having an opening 62 therethrough for receipt of the upper arm 32. The upper portion of the body 60 includes a threaded bolt 64 having a knurled hand-engaging head 66 such that the body 62 may be rotated in various angular attitudes with respect to the bar 32 and thus the table 22 and fixed in such position by the bolt 64. In that regard, the bolt 64 acts as a set screw or similar positioning device. The body 60 is also laterally movable with respect to the housing 12 along the longitudinal extent of the bar 32. In some cases, it is desirable to be able to fix or at least record the position of the scoring device 40 with respect to the table; and in this regard, a collar 68 is provided with a set screw 70. The collar is also slidable on the bar 32 but fixable in relationship thereto. The body 60 includes a holder 72 for a conventional wheel 74. The holder 72 may be inserted within a slot 76 formed in the lower portion of the body 60 and held therein by a set screw 78. As best shown in FIGS. 4 and 5, the table 22 is provided with an open slot 80 oriented in a front to rear direction with respect to the housing. A supporting wheel 82 is positioned in the housing 12 and vertically aligned with the slot such that a circumferential portion thereof projects above the supporting surface 24. Such projection is slight and the wheel is preferably provided with a slightly deformable, that is, resilient outer surface so as to frictionally contact the under surface of the sheet 26 when positioned thereabove. The wheel 82 is adapted to be rotated either freely by the contact with the sheet 26 or positively as by a motor M in the direction of the arrow shown in FIG. 5, that is, in a front to rear direction such that the wheel 82 assists the front to rear movement of the sheet 26 across the supporting surface 24.

Accordingly in operation of the device 10, a sheet 26 is placed upon the table beneath the scoring device 40. The jack 48 is used to elevate the upper arm 32 a distance determined by experience and the sheet thickness so as to ultimately place a desired amount of tension thereon. Thereafter, the scoring device 40 is clamped in position upon the upper bar 32 as by manipulation of knurled wheel 66 so that the scoring wheel 74 engages the upper surface of the sheet 26. Thereafter, the jack force is released as depicted in FIG. 3 such that the required scoring pressure is exerted via the wheel 74 upon the upper surface of the sheet 26. Thereafter, the sheet may be manipulated by the artisan's hands in the desired pattern by pushing the sheet rearwardly across the table 22. During such movement the scoring element scores the upper portion of the sheet in the desired manner. Thereafter the wheel 82 may be utilized as a breaking element by aligning the resultant sheet score therealong and by exertion of force on opposite sides thereof. Such will assist in the breaking of the sheet along such scored line. In addition, the wheel 82 by engaging the under surface of the sheet 26 enables its movement across the table and when powered as by the motor M positively assists in the moving of such sheet.

In addition, an auxiliary sheet supporting or movement device 90 in the form of a spherical ball 92 is mounted within a secondary opening 94 extending through the table surface 24 so as to slightly enable the ball to project thereabove. The ball 92 may be held within a pocket or frame 94 by means of a ring 96 positioned above the center line thereof and, accordingly, support the ball for omnidirectional movement within the confines of such socket. Contact of the sheet 26 with the ball 92 enables the sheet to be more easily moved in a lateral and curvalinear fashion with regard to the supporting surface 24. Such movement assists the operator of the device in making curvalinear shaped scores and the like. This is particularly useful when forming shaped patterns for stained glass and similar arts and crafts projects. The opening 94 is positioned forward of the slot 80 and, accordingly when utilized, the scoring element 40 may be positioned directly thereabove by appropriate arcuate movement of the member 30 vis-a-vis the housing by adjusting its lower arm 34 contact with the sleeve 38 as previously described. The arm 30 is thus conveniently adjustable by such arcuate movement between a position overlying the ball 92 and a position overlying the wheel 82. It should also be brought out that the scoring device 40 may also be positioned in a wide variety of other overlying attitudes with respect to the table 22 by a combination of arcuate movement of the U-shaped member 30 and the movement of the scoring element along the upper bar 32 and its rotational movement with respect thereto.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for cutting glass or other sheet material comprising a housing including a table having an upper substantially planar supporting surface for supporting and moving said sheet with respect thereto, a substantially U-shaped member having an upper arm and a lower arm, said lower arm fixedly connected to said housing for supporting said upper arm in a position overlying said table, a scoring element positioned on said upper arm for spring biased pressure contact with sheet disposed on said table, and means for temporarily forcing said upper arm upwardly with respect to said table so as to adjust said pressure contact between said scoring element and said sheet and for thereafter releasing said force.

2. The apparatus of claim 1, said lower connection with said housing permitting said member to at least partially rotate with respect to said housing so that said upper arm is variably positionable above said table in a front to rear direction thereof.

3. The apparatus of claim 1, said scoring element at least partially rotatable with respect to said upper arm within a plane normal thereto so as to be adjustably positionable at a plurality of angular attitudes and thus heights with respect to said table.

4. The apparatus of claim 2, said scoring element at least partially rotatable with respect to said upper arm within a plane normal thereto so as to be adjustably positionable at a plurality of angular attitudes with respect to said table.

5. The apparatus of claim 1, said force means extending between said member arms and fixedly mounted on said lower arm, said force means including an elevatable top portion adapted to contact said upper arm so as to temporarily force said arms apart a predetermined distance coresponding to the force desired to be applied to said sheet by said element.

6. The apparatus of claim 4, said force means extending between said member arms and fixedly mounted on said lower arm, said force means including an elevatable top portion adapted to contact said upper arm so as to temporarily force said arms apart a predetermined distance corresponding to the force desired to be applied to said sheet by said element.

7. The apparatus of claim 5, said force means including a lower body fixedly attached to said lower arm and said top portion threadably engaged to said body, said top portion including an outwardly extending handle for arcuately turning said top portion with respect to said body.

8. The apparatus of claim 7, said member being an integral bent metal rod having relatively increasing spring tensions required to force said arms apart increased distances.

9. The apparatus of claim 1, said table including a front to rear oriented slot, a wheel rotatably mounted in said housing and adapted to have a portion thereof slightly extend above said table surface for frictionally contacting the bottom of said sheet, said scoring element adapted for positioning above said slot.

10. The apparatus of claim 9, said table including an opening positioned directly forward of and spaced from said slot, a spherical sheet contacting ball supported by said housing for free rotation and adapted to slightly extend through said opening, said lower connection with said housing permitting said member to at least partially rotate with respect to said housing so that said upper arm is variably positionable above said table in a front to rear direction thereof whereby said element may be alternately positioned above said roller and said ball.

11. The apparatus of claim 9, including motor means for positively rotating said roller in an arcuate direction from the front to the rear of said table.

* * * * *